US007694918B2

(12) United States Patent
Zhang et al.

(10) Patent No.: US 7,694,918 B2
(45) Date of Patent: Apr. 13, 2010

(54) WIRE CLAMP FOR MACHINE

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 336 days.

(21) Appl. No.: 11/765,451

(22) Filed: Jun. 20, 2007

(65) Prior Publication Data

US 2008/0105792 A1 May 8, 2008

(30) Foreign Application Priority Data

Nov. 8, 2006 (CN) ........................ 2006 1 0201081

(51) Int. Cl.
*F16L 3/00* (2006.01)

(52) U.S. Cl. ............................ 248/52; 248/49; 248/65; 248/231.9; 248/51

(58) Field of Classification Search ................... 248/49, 248/51, 52, 68.1, 65, 72, 74.1, 231.9, 316.1, 248/316.6
See application file for complete search history.

(56) References Cited

U.S. PATENT DOCUMENTS 1,908,067 A * 5/1933 Sharp et al. .................... 248/49
2,288,158 A * 6/1942 Ellinwood .................. 174/135
2,354,919 A * 8/1944 Lockwood ................. 248/68.1
2,631,346 A * 3/1953 Wengen et al. .............. 439/791
2,712,167 A * 7/1955 Blanchard .................... 24/569
3,672,556 A * 6/1972 Diepeveen ................. 228/49.5
3,695,563 A * 10/1972 Evans .......................... 248/56
3,856,244 A * 12/1974 Menshen .................. 248/67.5
3,894,706 A * 7/1975 Mizusawa .................. 248/68.1
4,136,441 A * 1/1979 Neale, Sr. .................... 29/872
T100,605 I4 * 5/1981 Christian .................. 248/68.1
4,595,162 A * 6/1986 Matsumura et al. ........ 248/68.1
4,628,600 A * 12/1986 Gordon et al. ................ 29/861
4,659,279 A * 4/1987 Akeel et al. ................. 414/680
4,781,319 A * 11/1988 Deubzer et al. .............. 228/4.5
4,799,641 A * 1/1989 Koreski ..................... 248/68.1
4,842,227 A * 6/1989 Harrington et al. ............ 248/56
5,711,055 A * 1/1998 Quick ........................ 24/16 R
5,784,771 A * 7/1998 Beakes et al. ................. 29/596
5,931,423 A * 8/1999 Heideloff ................... 248/74.4
6,105,687 A * 8/2000 Hansson ..................... 173/217
6,173,926 B1 * 1/2001 Elvegaard .................. 248/74.1
6,446,915 B1 * 9/2002 Ismert ....................... 248/68.1
6,494,412 B2 * 12/2002 Gombert ...................... 248/65
6,700,064 B2 * 3/2004 Aoki et al. ..................... 174/69
6,752,359 B2 * 6/2004 Nagenkogl et al. ............ 248/49
6,782,761 B2 * 8/2004 Imai et al. ................ 73/861.27

(Continued)

*Primary Examiner*—J. Allen Shriver, II
*Assistant Examiner*—Michael McDuffie
(74) *Attorney, Agent, or Firm*—Frank R. Niranjan

(57) ABSTRACT

A wire clamp for protecting a wire in a reciprocating machine includes an upper clamping member and a lower clamping member configured for slidably sandwiching the wire therebetween. The upper clamping member or the lower clamping member is pivotably mounted to the reciprocating machine. When the wire bends to travel during reciprocating movement, the upper and lower clamping members are pivoted with the wire to prevent the wire from being sharply bent which leads to stress concentration. Thus, fatigue of the wire will be reduced and a life span of the wire will be prolonged.

6 Claims, 5 Drawing Sheets

U.S. PATENT DOCUMENTS 6,863,248 B2 * 3/2005 Calais et al. .................. 248/49
6,881,902 B2 * 4/2005 Aoki et al. ................ 174/72 A
2004/0118981 A1 * 6/2004 Johnson ....................... 248/49
2005/0082437 A1 * 4/2005 Lo ............................. 248/49
2007/0152109 A1 * 7/2007 Kroening et al. .............. 248/65

* cited by examiner

WIRE CLAMP FOR MACHINE

BACKGROUND OF THE INVENTION

1. Field of the Invention

The present invention relates to wire clamps, and particularly to a wire clamp for protecting a wire in a machine which performs a reciprocating motion.

2. Description of Related Art

A reciprocating machine, such as a punch, a lock seaming machine and etc, has a moving part which performs a reciprocating motion. Wires, such as electrical wires, data wires and etc, are connected to the moving part with their corresponding ends. The other end of each wire passes through a hole of a chassis of the machine to be connected with a power source or a controller. The wires are generally directly clamped at the hole. However, a clamped portion of each wire is sharply bent frequently and stressed when the wires moves together with the moving part of the machine. Thus, the wires are easily fatigued and even broken.

What is desired, therefore, is a wire clamp for protecting a wire in a reciprocating machine.

SUMMARY OF THE INVENTION

An exemplary wire clamp for protecting a wire in a reciprocating machine includes an upper clamping member and a lower clamping member configured for slidably sandwiching the wire therebetween. The upper clamping member or the lower clamping member is pivotably mounted to the reciprocating machine. When the wire bends to travel during reciprocating movement, the upper and lower clamping members are pivoted with the wire to prevent the wire from being sharply bent.

Other advantages and novel features will become more apparent from the following detailed description when taken in conjunction with the accompanying drawings, in which:

DETAILED DESCRIPTION OF THE INVENTION

Figure 1:
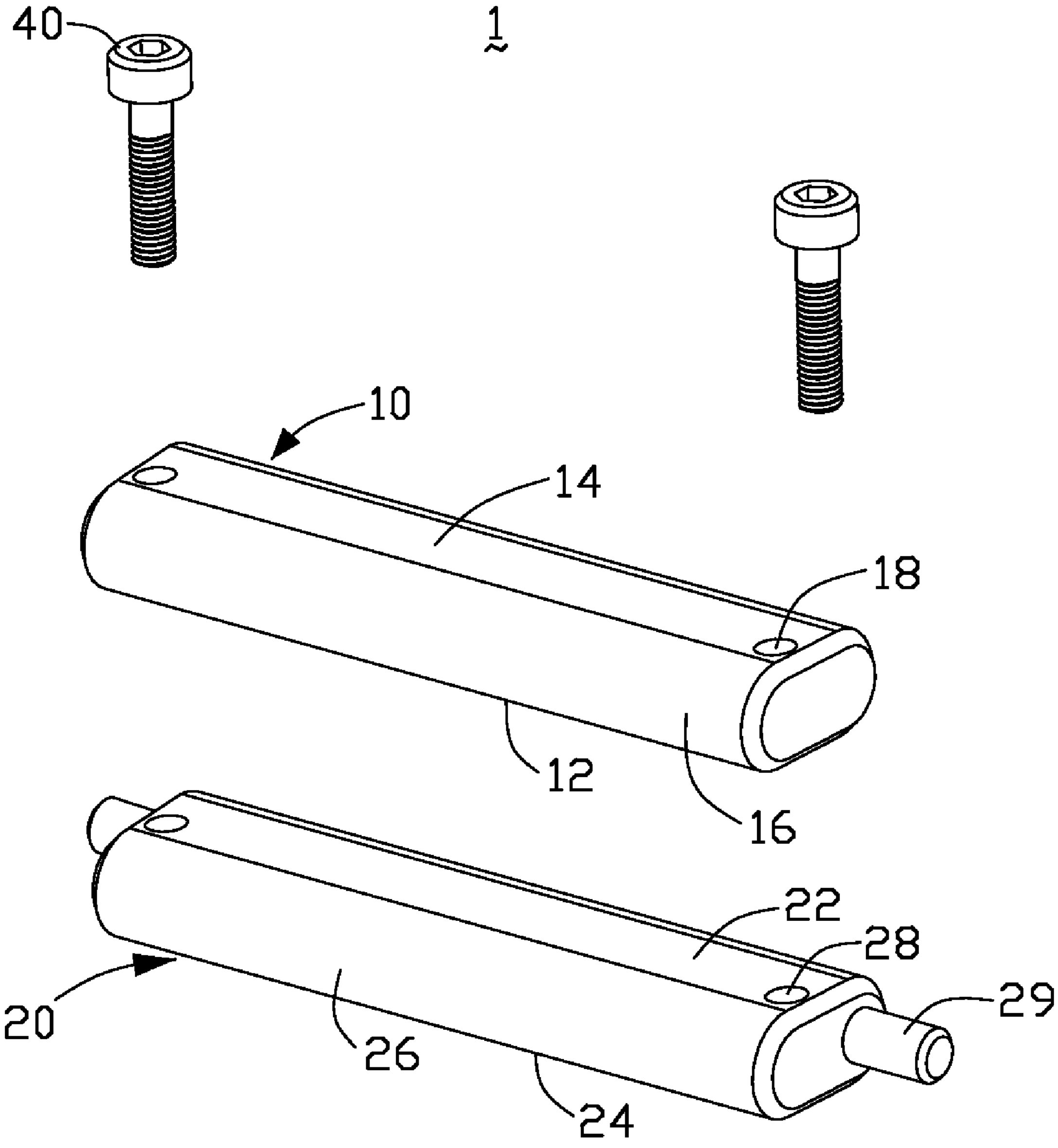
FIG. 1 is an exploded, isometric view of a wire clamp in accordance with an embodiment of the present invention.
Figure 2:
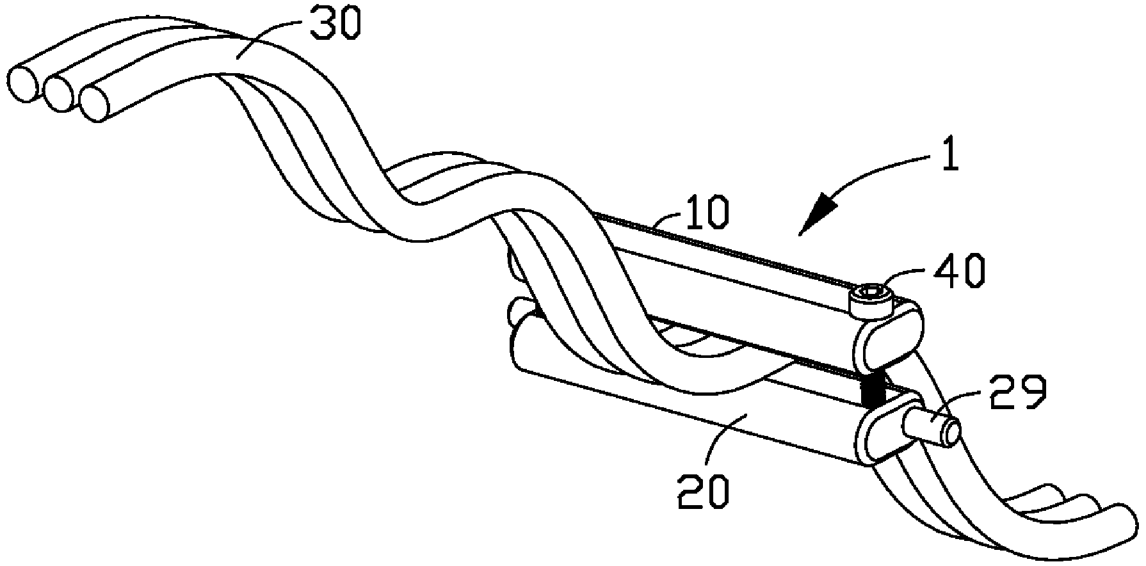
FIG. 2 is an assembled, isometric view of FIG. 1, together with some wires.

Referring to FIGS. 1 and 2, a wire clamp 1 in accordance with a preferred embodiment of the present invention includes an upper clamping member 10 and a lower clamping member 20. The wire clamp 1 is used to clamp wires or cables 30 of a reciprocating machine 2 (shown in FIGS. 3 and 4).

The upper clamping member 10 has a flattened cylindrical shape. The upper clamping member 10 comprises a flat lower surface 12 configured for directly touching with the wires 30, and a flat upper surface 14 opposing the lower surface 12. The lower surface 12 and the upper surface 14 are connected by two surfaces 16. Each surface 16 is curved to minimize stress to the wires 30 coming into repeated contact with the surfaces 16 during reciprocating movement of part 4 (shown in FIG. 4) of the machine 2. Two through mounting holes 18 are defined in opposite ends of the upper clamping member 10, extending from the upper surface 14 to the lower surface 12.

The lower clamping member 20 has a flattened cylindrical shape. An upper surface 22 configured for directly touching with the wires 30, and a lower surface 24 of the lower clamping member 20 are both flat. The upper surface 22 and the lower surface 24 are connected by two surfaces 26. Each curved surface 26 is curved to minimize stress to wires 30 coming into repeated contact with the surfaces 26 during reciprocating movement of part 4 of the machine 2. Two mounting holes 28 (threaded screw holes in this embodiment) are defined in the lower clamping member 20 at opposite ends of the upper surface 22. Two pivots 29 extend from opposite lateral ends of the lower clamping member 20 respectively in a direction parallel to the axis of the lower clamping member 20. In this embodiment, the pivots 29 offset from the axis.

Figure 3:
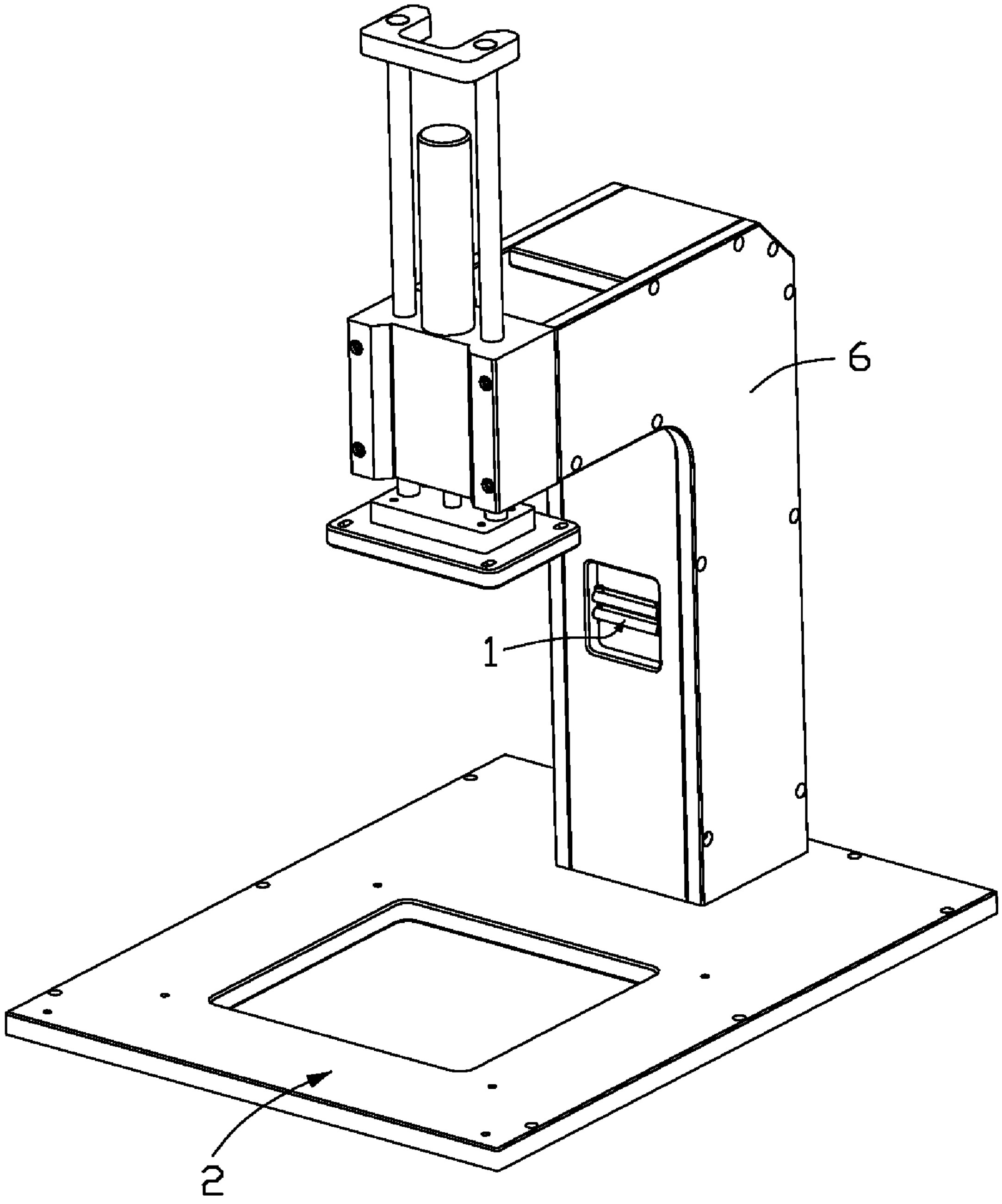
FIG. 3 is an isometric view of the wire clamp of FIG. 1 fixed to a chassis of a reciprocating machine.
Figure 4:
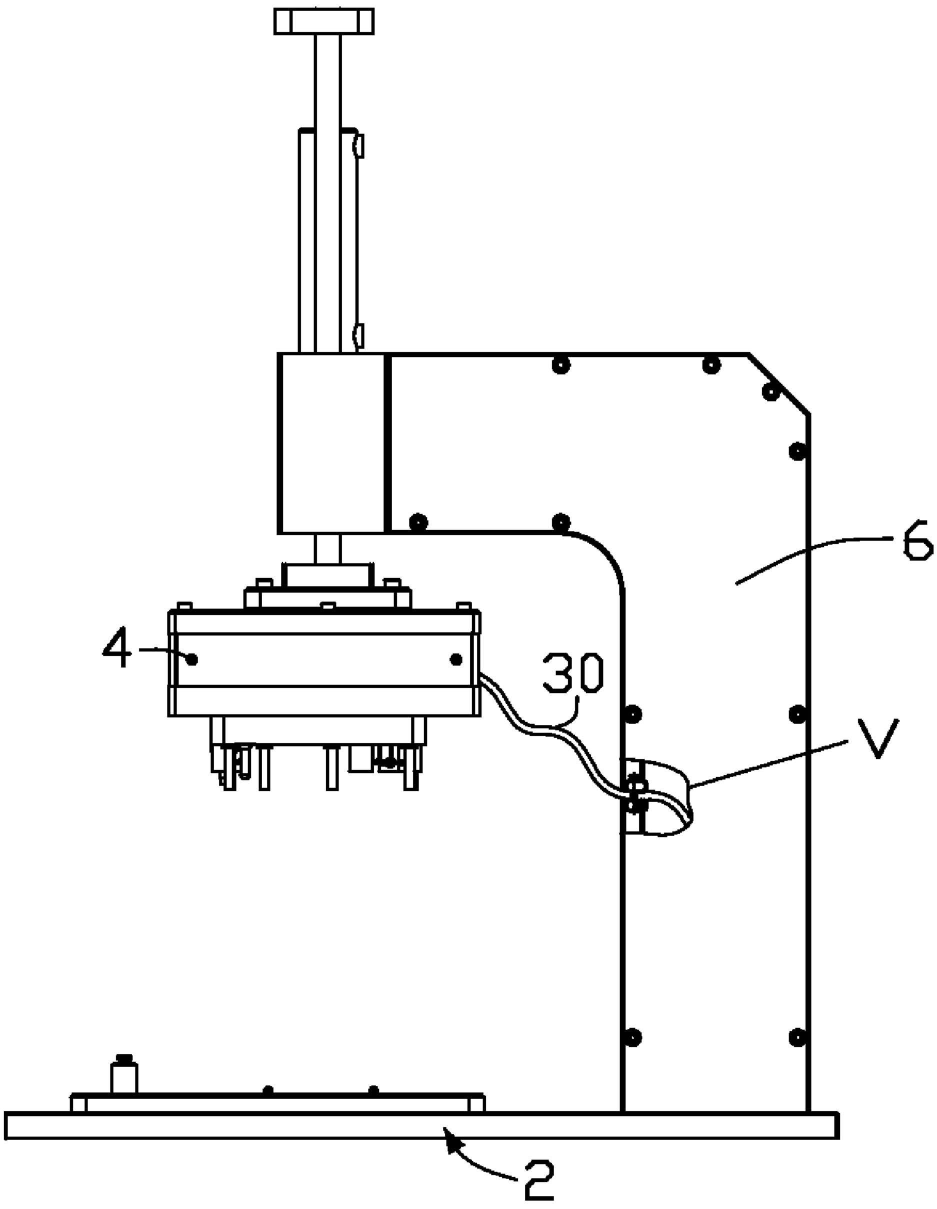
FIG. 4 is a side elevational view of the reciprocating machine, together with the wire clamp and the wires of FIG. 2.
Figure 5:
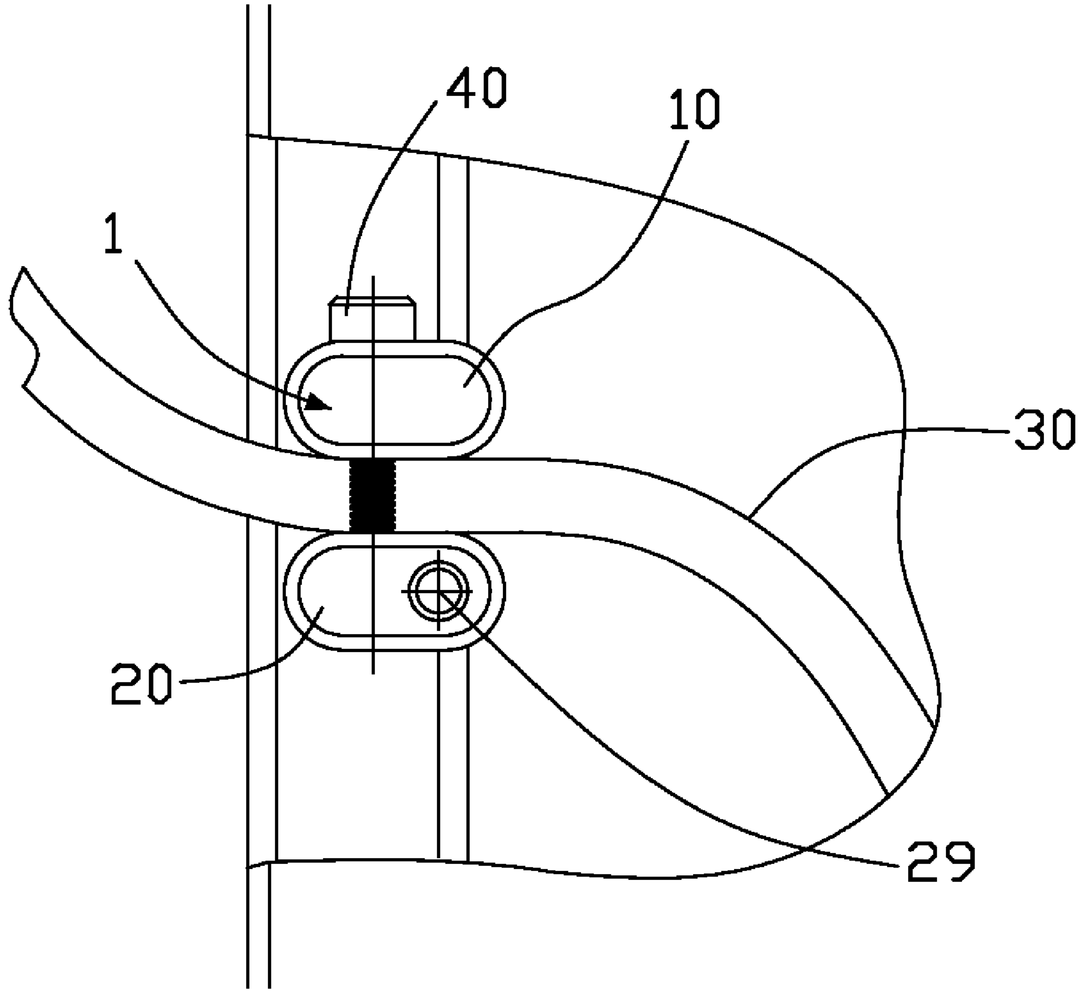
FIG. 5 is an enlarged view of circled portion V of FIG. 4.

Referring to FIGS. 3 to 5, in assembling the wire clamp 1 to a chassis 6 of the reciprocating machine 2, the lower clamping member 20 is pivotably attached to the chassis 6 via the two pivots 29. In clamping the wires 30, the wires 30 are placed on the upper surface 22 of the lower clamping member 20. The upper clamping member 10 is placed on the lower clamping member 20, with the lower surface 12 touching with the wires 30. Two fasteners such as screws 40 are inserted through the corresponding mounting holes 18 of the upper clamping member 10, and engaged in the corresponding mounting holes 28 of the lower clamping member 20. Thus, the upper clamping member 10 and the lower clamping member 20 are fixed together to clamp the wires 30 therebetween, and the wires 30 are firmly clamped by the wire clamp 1. One end of each wire 30 is connected to the moving part 4 of the reciprocating machine 2, and the other end of each wire 30 is connected to a power source or a controller (not shown) in the chassis 6 of the reciprocating machine 2.

In use, the moving part 4 of the reciprocating machine 2 performs a reciprocating motion, for example, moving in an up-and-down direction. Portions of the wires 30 between the moving part 4 and the wire clamp 1 bends and move together with the moving part 4, and drive the wire clamp 1 to pivot about the pivots 29. Thus, the portions of the wires 30 adjacent the wire clamp 1 are not sharply bent or folded, and the curved surfaces 16, 26 of the upper and lower clamping members 10, 20 ensure that should the wires 30 repeatedly contact wire clamp 1 during the reciprocation motion that they are smoothly laid against the curved surfaces 16, 26 rather than worn or bent against sharp edges or corners.

Similarly, another wire clamp 1 can be pivotably mounted to the moving part 4 of the reciprocating machine 2 to clamp portions of the wires 30 adjacent the moving part 4 for avoiding stress to the portions.

In other embodiments, a plurality of slots (not shown) configured for receiving the wires 30 may be correspondingly traversely defined in the lower surface 12 of the upper clamping member 10 and the upper surface 22 of the lower clamping member 20 in order to increase a contact area between the wires 30 and the wire clamp 1 for enhancing friction. The pivots 29 can be replaced by two L-shaped projecting parts extending from the upper surface 22 to the corresponding ends of the lower clamping member 20, the pivots 29 can also be formed from relative end planes of the upper clamping member 10, or any other way that can make the wire clamp 1 pivot around its major axis.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A wire clamp for protecting a wire in a reciprocating machine, comprising:

an upper clamping member and a lower clamping member fixed together and configured for slidably sandwiching the wire therebetween, one of the upper clamping member and the lower clamping member capable of being pivotably mounted to the reciprocating machine;

wherein a first planar wire contact surface is defined on a bottom of the upper clamping member for directly touching with the wire, and a second planar wire contact surface is defined on a top of the lower clamping member for directly touching with the wire;

wherein two first curved surfaces extend up from opposite sides of the first wire contact surface of the upper clamping member, and two second curved surfaces extend down from opposite sides of the second wire contact surface of the lower clamping member;

wherein each of the upper clamping member and the lower clamping member has a flattened cylindrical shape, the upper clamping member further comprises a first side surface opposite to and parallel to the first wire contact surface of the upper clamping member, and the lower clamping member further comprises a second side surface opposite to and parallel to the second wire contact surface of the lower clamping member.

2. The wire clamp as claimed in claim 1, wherein two pivots respectively extend from opposite ends of the lower clamping member for pivotably mounting the wire clamp to the reciprocating machine.

3. The wire clamp as claimed in claim 2, wherein two mounting holes are defined at opposite ends of the upper clamping member, extending through the first side surface and the first wire contact surface, further two mounting holes are defined in the lower clamping member at opposite ends of the second wire contact surface, and two fasteners are inserted through the corresponding mounting holes of the upper clamping member and engaged in the corresponding mounting holes of the lower clamping member.

4. A machine, comprising:

a stationary part;

a moving part being reciprocatingly moveable relative to the stationary part;

a wire connected between the stationary part and the moving part and being moveable with the moving part; and a wire clamp pivotably attached to the stationary part, the clamp comprising an upper clamping member and a lower clamping member sandwiching the wire therebetween such that when the wire bends to travel with the moving part during reciprocating movement, the upper and lower clamping members are pivoted with the wire to prevent the wire from being sharply bent;

wherein the wire clamp is pivotably attached to the stationary part via a pivot which is substantially perpendicular to the reciprocatingly moving direction of the moving part;

wherein each of the upper and lower clamping members has a flattened cylindrical shape with a flat contacting surface, and the wire traverses through the wire clamp and is slidably sandwiched between the flat contacting surfaces of the upper and lower clamping members.

5. The machine as claimed in claim 4, wherein the upper and lower clamping members each have a curved surface extending from the contacting surface such that when the wire bends to travel with the moving part during reciprocating movement, the wire is smoothly laid against the curved surfaces.

6. The machine as claimed in claim 4, wherein the upper and lower clamping members are fixed together with screws, and the pivot extends from the lower clamping member and pivotably attached to the stationary part.

* * * * *